United States Patent
Yeom

(10) Patent No.: US 7,483,415 B2
(45) Date of Patent: Jan. 27, 2009

(54) METHOD OF PROVIDING SIMULTANEOUS CALL SERVICE OF A DUAL MODE TERMINAL

(75) Inventor: Jae Sung Yeom, Incheon (KR)

(73) Assignee: LG Electronics Inc., Seoul (KR)

(*) Notice: Subject to any disclaimer, the term of this patent is extended or adjusted under 35 U.S.C. 154(b) by 71 days.

(21) Appl. No.: 10/920,363

(22) Filed: Aug. 18, 2004

(65) Prior Publication Data
US 2005/0047398 A1 Mar. 3, 2005

(30) Foreign Application Priority Data
Sep. 1, 2003 (KR) .............. 10-2003-0060903

(51) Int. Cl.
*H04L 12/28* (2006.01)
(52) U.S. Cl. .............. 370/352; 370/338
(58) Field of Classification Search ........ 455/415, 455/436, 414.1, 422, 553
See application file for complete search history.

(56) References Cited

U.S. PATENT DOCUMENTS

| | | | | |
|---|---|---|---|---|
| 2002/0111169 | A1* | 8/2002 | Vanghi | 455/436 |
| 2003/0083097 | A1* | 5/2003 | Kim | 455/553 |
| 2004/0203674 | A1* | 10/2004 | Shi et al. | 455/415 |

FOREIGN PATENT DOCUMENTS

| | | |
|---|---|---|
| CN | 1505414 | 6/2004 |
| CN | 1512696 | 7/2004 |
| CN | 1571322 | 1/2005 |
| KR | 2002-0036187 | 5/2002 |
| KR | 2002-0048580 | 6/2002 |
| KR | 2003-0046855 | 6/2003 |
| WO | WO 02/45443 | 6/2002 |

OTHER PUBLICATIONS

Chinese Office Action dated Sep. 1, 2006.
Chinese Office Action dated Mar. 14, 2008 (and English-language translation).

* cited by examiner

*Primary Examiner*—Vincent P. Harper
*Assistant Examiner*—Phuoc Doan
(74) *Attorney, Agent, or Firm*—KED & Associates, LLP

(57) ABSTRACT

A method is provided for a simultaneous call service of a dual mode mobile terminal that simultaneously supports a CDMA 2000 1x Release A and a EVDO system. A dual mode mobile terminal may set a voice call that is additionally requested regardless of a service system for a data call, which is being provided for service, by a call setting procedure of a simultaneous call service provided by the CDMA 2000 1x Release A system. In addition, if the voice call is released while the voice call and a data call are being simultaneously provided for service from the CDMA 2000 1x Release A system, the dual mode mobile terminal may reselect a service system for the data call to a system having a wider bandwidth.

8 Claims, 3 Drawing Sheets

METHOD OF PROVIDING SIMULTANEOUS CALL SERVICE OF A DUAL MODE TERMINAL

The present application claims priority from Korean Patent Application No. 60903/2003, filed Sep. 1, 2003, the subject matter of which is incorporated herein by reference.

BACKGROUND OF THE INVENTION

1. Field of the Invention

Embodiments of the present invention may relate to a dual mode terminal that supports one or more radio systems. More particularly, embodiments of the present invention may relate to a method of providing a simultaneous call service of a dual mode terminal.

2. Background of Related Art

A mobile communication system may be divided into a synchronous system and an asynchronous system. A CDMA 2000 1x Release A system and a 1x EV-DO system are examples of synchronous systems.

The CDMA 2000 1x Release A (hereinafter also the '1x Release A') system was developed for a voice communication service at an early stage of CDMA 2000 development. However, versions of the CDMA 2000 1X Release A system may support radio data services. The 1x EVDO (hereinafter the 'EVDO') system was developed for supporting high speed radio data service.

The above-described two radio systems may be different in their modulating and demodulating methods, although they may use the same frequency band and the same code division multiplexing. Accordingly, a dual mode mobile terminal that can simultaneously support the two radio systems has been developed in order to complementarily receive a service from both radio systems.

One characteristic of the 1x Release A system is the ability to provide simultaneous voice and data service. During voice communication, a user can receive data service by setting a new data call without cutting off voice communication. On the other hand, while receiving data service, a user can additionally perform voice communication whenever necessary. The voice communication may include an outgoing call and an incoming call.

On the other hand, since the EVDO system is devised only for the purpose of providing data service, simultaneous voice and data service has not been provided from the radio system. Accordingly, in a situation that a data call has been previously set in the EVDO system, an additional voice communication service cannot be provided in disadvantageous arrangements. However, a user having a dual mode mobile terminal may not know and may not care about the kind of radio system being used to provide the service. Accordingly, the user may want to receive both voice and data services regardless of the kind of system that is currently connected thereto. Therefore, a method is desired for overcoming differences between two radio systems of a dual mode terminal and providing the user with the same functions.

SUMMARY OF THE INVENTION

Embodiments of the present invention may provide a method of providing a simultaneous call service of a dual mode terminal capable of effectively providing a simultaneous voice and data service according to a radio system.

Embodiments of the present invention may provide a simultaneous call service of a dual mode terminal capable of providing service of good quality by converting a service system according to a voice call and/or a data call.

A method may be provided for a simultaneous call service of a dual mode terminal that supports the CDMA 2000 1x Release A system and the EVDO system. The dual mode mobile terminal may set a voice call that is requested regardless of the type of service system of a data call. This may be accomplished by a call service setting procedure for a simultaneous call service provided by the CDMA 2000 1x Release A system. The dual mode mobile terminal may transition the data call to a dormant state and then convert the service system to the 1x Release A system.

A method may be provided for a simultaneous call service of a dual mode mobile terminal that supports the CDMA 2000 1x Release A system and the EVDO system at the same time. This method may include determining a service system of a data call when a voice call is requested during the data call service. The method may also include performing transition from the data call to a dormant state if the service system is an EVDO system and then converting the service system into the CDMA 2000 1x Release A system. The method may still further include allocating a voice call according to a call setting procedure of the 1x Release A system and receiving a radio resource of the 1x Release A system if the voice call is set and the data call has undergone transition to the dormant state. If the service system is a 1x Release A system, the dual mode mobile terminal may directly allocate a voice call to provide a simultaneous call service.

A method may be provided for a simultaneous call service of a dual mode mobile terminal that supports the CDMA 2000 1x Release A system and the EVDO system at the same time. The dual mode mobile terminal may select a service system for a data call when a voice call is released while the voice call and the data call are simultaneously provided for service from the CDMA 2000 1x Release A system.

The dual mode mobile terminal may also receive margin bandwidth information of a corresponding base station from the CDMA 2000 1x Release A system and the EVDO system. The dual mode mobile terminal may select a system having a wider margin bandwidth as a service system. The system providing the wider bandwidth may be the EVDO system. If the 1x Release A system has a wider bandwidth, the dual mode mobile terminal may maintain the data call without changing the service system.

The foregoing and other objects, features, aspects, advantages and embodiments of the present invention may become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate arrangements and embodiments of the invention and together with the description serve to explain principles of the invention.

The following represents brief descriptions of the drawings in which like reference numerals represent like elements and wherein.

DETAILED DESCRIPTION OF PREFERRED EMBODIMENTS

Figure 1:
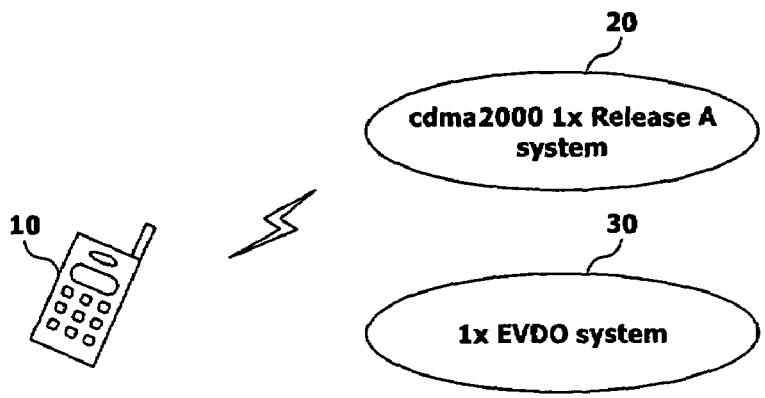
FIG. 1 is a schematic view of a mobile communication system according to an example arrangement.

FIG. 1 is a schematic view of a mobile communication system according to an example arrangement. Other arrangements are also possible. More specifically, FIG. 1 shows a mobile communication system that includes a dual mode terminal 10, a 1x Release A system 20 and a EVDO system 30. The dual mode terminal 10 may connect with the 1x Release A system 20 when there is a request for voice communication and may connect with either one of the systems 20, 30 when there is a request for a data call. In this arrangement, priority may be given to the EVDO system 30, for example.

If a user requests voice communication during a data call that has already been set and the user is being provided with the data service, then the dual mode terminal 10 may perform a data call service based on the type of radio system. For example, if a data call is being provided in the 1x Release A system 20, the dual mode terminal 10 may additionally set a voice call based on the 1x Release A standard while maintaining the data call so that a simultaneous service of voice and data calls may be provided. On the other hand, if the data call is being provided in the EVDO system, in disadvantageous arrangements the dual mode terminal 10 may not support a voice call, or the dual mode terminal may release the data call and then perform a voice call setting in the 1x Release A system 20. That is, in the EVDO system, data and voice communications may not be performed at the same time in disadvantageous arrangements. In addition, if a user releases a voice call while the voice call and the data call based on the 1x Release A system are being provided for service at the same time, the dual mode terminal 10 may receive a data service from the 1x Release A system.

If a user intends to make a voice communication in a situation that an initial data service is provided in the EVDO system, a dual mode terminal may not provide the voice communication service, or may release the preset data service and then provide a voice communication service. On the contrary, if an initial data service is provided from the 1x Release A system, the dual mode terminal may provide a simultaneous service of voice and data by additionally setting a voice call without releasing the data call. However, providing different services depending on the type of radio system can cause inconveniences to the user, and there is a problem in features of a dual mode terminal may be degraded because practical dual mode operation is not conveniently provided.

In addition, another problem may occur in disadvantageous arrangements when a user first releases a voice communication while voice and data are both provided from a 1x Release A system. That is, if the user releases the voice communication while voice and data services are being provided at the same time through the mobile terminal, the data call may be provided from the 1x Release A system. When the mobile terminal is a dual mode terminal and services are only provided for a data call, if the service is provided from an EVDO system having a wider radio bandwidth, the data service may be provided at a faster transmission speed. However, since a user who has received a simultaneous service (i.e., voice and data) continuously receives a data service from the 1x Release A system, the user may not receive a data service of good quality.

Embodiments of the present invention may provide a method in which a dual mode terminal applies a simultaneous call service support function for not only a 1x Release A system but also to an EVDO system in a radio system in which different kinds of a mobile communication systems such as a CDMA 2000 1x Release A system and an EVDO system are mixed. That is, embodiments of the present invention may provide a method for additionally setting (or releasing) a voice call regardless of the type of radio system that provides a data call service when the dual mode terminal intends to receive a simultaneous voice and data service.

Embodiments of the present invention may provide a method of converting a service system into the 1x Release A system to thereby perform a simultaneous voice and data service. In disadvantageous arrangements, this may not have been possible to perform in a EVDO system when a voice call was additionally requested during a data call service by the EVDO system. Embodiments of the present invention may provide a method for reselecting an optimal service system for a data call service when a voice call is released during a simultaneous call service of a voice call and a data call.

A method of providing a simultaneous call service of a dual mode terminal may be applied to a mobile communication system such as shown in FIG. 1.

Figure 2:
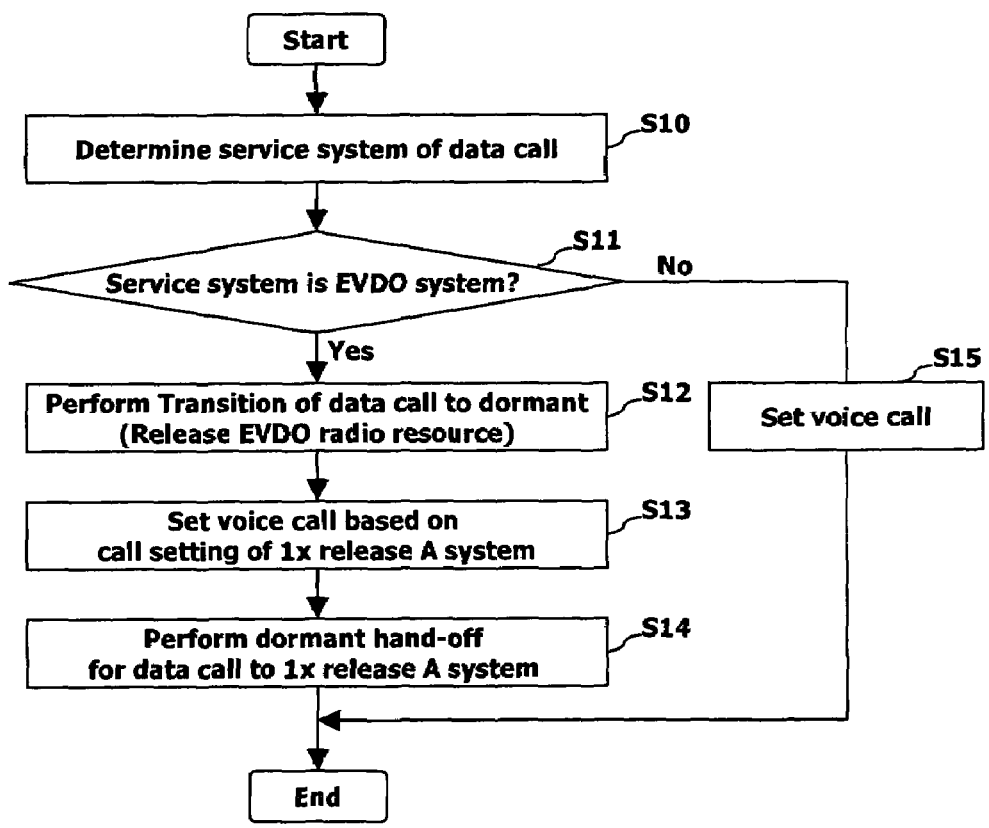
FIG. 2 is a flow chart showing a method of providing a simultaneous call service of a dual mode terminal in accordance with an example embodiment of the present invention.

FIG. 2 is a flow chart showing a method of providing a simultaneous call service of a dual mode terminal in accordance with an example embodiment of the present invention. Other embodiments, operations and orders of operation are also within the scope of the present invention. More specifically, FIG. 2 relates to a voice call supporting method when a voice call is additionally requested during a data call service in the EVDO system.

When a voice call is additionally requested during a data call service, a dual mode terminal 10 may determine a service system of an ongoing data call (S10). If the service system is the EVDO system 30, the dual mode terminal may request that certain radio resources of the EVDO system 30 be released, thereby transitioning from the data call to a dormant state (S11, S12). More specifically, if the service system is the EVDO system 30, the dual mode terminal 10 may not completely release the data call but rather may transition to a dormant state. The transition may be made by releasing a radio resource of the EVDO system 30.

In this state, the dual mode terminal 10 may convert the system into the 1x Release A system 20 as the service system, and the requested voice call may be wirelessly set (S13). As shown in FIG. 2, the dual mode terminal 10 may perfom a dormant hand-off for the data call to the 1x Release A system 20 (S14). Once the voice call setting is completed, the dual mode terminal 10 may receive a radio resource of the 1x Release A system 20 by using simultaneous voice and data call support functions of the 1x Release A system 20 so that the data call that has undergone transition to the dormant state in the previous operation (S12) is activated to continuously maintain the data service (S14).

On the other hand, if the service system is determined to be the 1x Release A system in operation S11, in order to set a voice call the dual mode terminal 10 may directly perform a procedure for a simultaneous voice and data service based on procedures defined by the 1x Release A standard without any additional procedures (S15).

Figure 3:
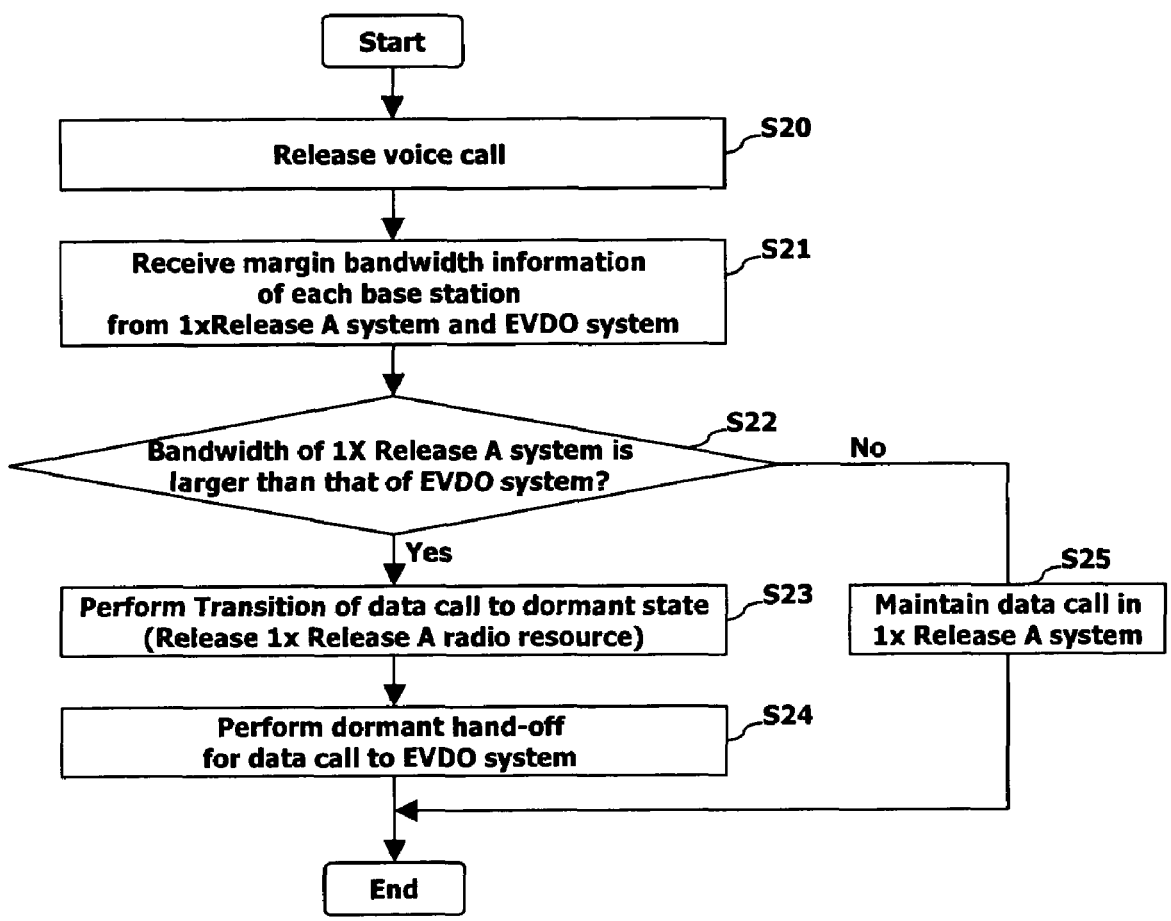
FIG. 3 is a flow chart showing a method of providing a simultaneous call service of a dual mode terminal in accordance with an example embodiment of the present invention.

FIG. 3 is a flow chart showing a method for providing a simultaneous call service of a dual mode terminal in accordance with an example embodiment of the present invention.

Other embodiments, operations and orders of operation are also within the scope of the present invention. More specifically, FIG. 3 relates to a method of determining a service system for a data call service according to a release of a voice call during a simultaneous call service.

If a release of a voice call is requested while a simultaneous call service is provided from the 1x Release A system 20, the dual mode terminal may release the requested voice call and then receive margin bandwidth information of each corresponding base station from the 1x Release A system 20 and the EVDO system 30 (S20, S21).

The dual mode terminal 10 may select a serviceable system based on a set reference by using obtained margin bandwidth information. That is, the dual mode terminal 10 may compare the bandwidths received from the 1x Release A system 20 and the EVDO system 30 and determine whether the bandwidth of the 1x Release A system 20 is wider than the bandwidth of the EVDO system 30 (S22).

If the bandwidth of the simultaneous call mode is smaller than the bandwidth of the EVDO mode (i.e., if the EVDO system 30 is determined to be able to provide a wider bandwidth than a bandwidth of the 1x Release A system 20), the dual mode terminal 10 may release a radio resource of the 1x Release A and perform transition of the data call to a dormant state (S23). Thereafter, the dual mode terminal 10 may connect with the EVDO system 30 to hand off to the dormant state (i.e., the dual mode terminal 10 connects with the data EVDO system 30 to receive a radio resource and activate the data call that has been transitioned to the dormant state) to thereby convert the service system into the EVDO system 30. Accordingly, a data service may be provided thereafter from the EVDO system 30 (S24).

On the other hand, if the 1x Release A system 20 is determined to be able to provide a wider bandwidth than the bandwidth of the EVDO system 30 in operation S22, the dual mode terminal 10 may not perform a procedure for changing a service system but rather may maintain a data call in the 1x Release A system 20 (S25).

Figure 4:
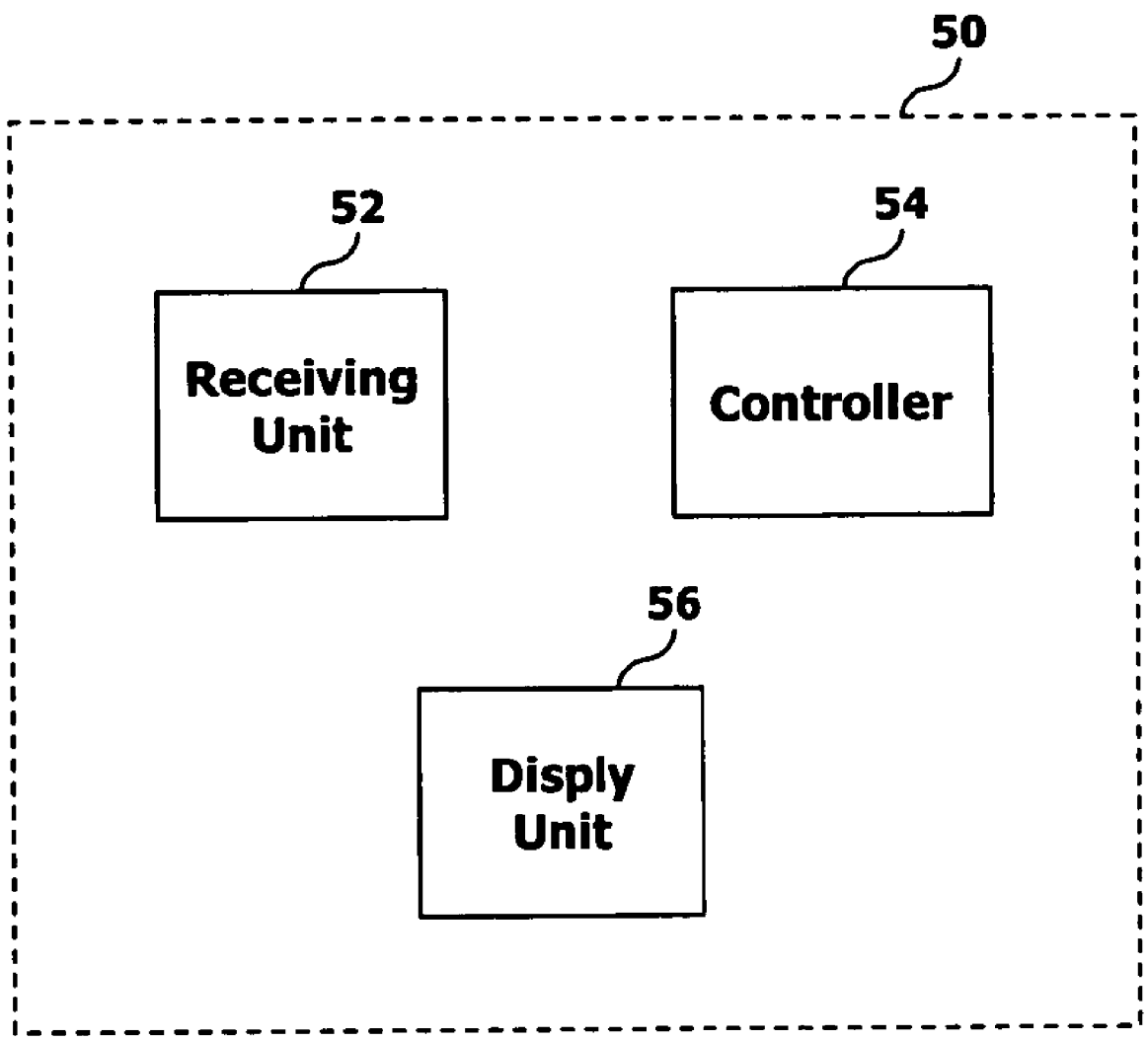
FIG. 4 is a diagram of a dual mode mobile terminal according to an example embodiment of the present invention.

FIG. 4 is a diagram of a dual mode mobile terminal according to an example embodiment of the present invention. Other embodiments and configurations are also within the scope of the present invention. The dual mode mobile terminal is capable of supporting both a CDMA 2000 1x Release A system and an EVDO system, for example. FIG. 4 shows a terminal 50 that includes a receiving unit 52 to receive/transmit information related to data calls and voice calls. This information may be communicated with the CDMA 2000 1x Release A system and the EVDO system. The receiving unit 52 may include an antenna system, for example. The terminal 50 may also include a controller 54 to perform various operations as discussed above with respect to both FIG. 2 and FIG. 3. The controller 54 may perform these operations based on information from the receiving unit 52. The mobile terminal 50 may also include other features such as a display unit 54.

Embodiments of the present invention that support simultaneous voice and data calls of the dual mode mobile terminal may result in several advantages. Other advantages are also within the scope of the present invention. As one example advantage, when the data is first set and is being provided for service, and there is a request for additional voice call settings, embodiments of the present invention may receive a simultaneous service of a voice call and a data call from the 1x Release A system without a recognition process of a user, regardless of whether a service radio system of a preset data call is a 1x Release A system or an EVDO system.

As another advantage, when a user of a dual mode mobile terminal that has received a simultaneous service of a voice call and a data call from the 1x Release A system releases the voice call and receives only the data call for service, embodiments of the present invention may receive a service of good quality at a faster transmission rate by converting a radio system providing a data service into a EVDO system that can provide a bandwidth that is wider than a bandwidth provided from the 1x Release A system.

Embodiments of the present invention may be embodied in several forms without departing from the spirit or essential characteristics thereof. It should also be understood that the above-described embodiments are not limited by any of the details of the foregoing description, unless otherwise specified, but rather should be construed broadly within its spirit and scope. Therefore, all changes and modifications are therefore intended to be embraced by the present disclosure.

What is claimed is:

1. A method of providing a call service of a dual mode mobile terminal, the method comprising the dual mode mobile terminal selecting a service system for a data call in response to releasing a voice call, wherein the voice call and the data call are simultaneously provided for service from two systems, and wherein selecting the service system includes:
   receiving margin bandwidth information at the mobile terminal from an EVDO system and from a CDMA 2000 system,
   determining that the EVDO system has a wider margin bandwidth than the CDMA 2000 system based on the margin bandwidth information received at the mobile terminal, and
   switching the service system of the mobile terminal from the CDMA 2000 system to the EVDO system when the EVDO system is determined to have the wider margin bandwidth than the CDMA 2000 system based on the margin bandwidth information received at the mobile terminal.

2. The method of claim 1, wherein the system providing the wider bandwidth comprises the EVDO system.

3. A method of providing service for a dual mode mobile terminal, the method comprising:
   performing a voice call;
   receiving margin bandwidth information at the mobile terminal from each of two systems;
   comparing the received margin bandwidth information from each of the two systems in order to determine which of the two systems has a wider margin bandwidth; and
   switching from a first system to a second system based on the comparing of the received margin bandwidth information from each of the two systems, wherein switching the system comprises:
      releasing a radio resource of the first system when the second system has a wider bandwidth than the first system,
      transitioning the data call of the mobile terminal to a dormant state,
      receiving a radio resource by connecting the mobile terminal with the second system, and
      activating the data call that has transitioned to the dormant state.

4. The method of claim 3, wherein the margin bandwidth information is received from the systems when the voice call is released after the voice call and data call are simultaneously provided.

5. The method of claim 3, wherein the two systems comprise a CDMA 2000 system and a EVDO system.

6. The method of claim 5, wherein the switching further comprises:

releasing a radio resource of the CDMA 2000 system when the EVDO system has a wider bandwidth than the CDMA 2000 system;
transitioning the data call of the mobile terminal to a dormant state;
receiving a radio resource by connecting the mobile terminal with the EVDO system; and
activating the data call that has transitioned to the dormant state.

7. The method of claim 5, further comprising maintaining the data call without a change of a service system when the CDMA 2000 system has a wider bandwidth.

8. The method of claim 3, further comprising receiving a data call service through the second system after switching to the second system.

* * * * *